J. FRIEDLANDER.

EYEGLASSES.

APPLICATION FILED JAN. 24, 1910.

Reissued Mar. 8, 1910.

13,088.

WITNESSES:

C. J. Hachenberg

C. W. Fairbank

INVENTOR

Joseph Friedlander

BY Munn & Co.

ATTORNEYS

UNITED STATES PATENT OFFICE.

JOSEPH FRIEDLANDER, OF NEW YORK, N. Y.

EYEGLASSES.

13,088. Specification of Reissued Letters Patent. Reissued Mar. 8, 1910.

Original No. 923,506, dated June 1, 1909, Serial No. 477,545. Application for reissue filed January 24, 1910. Serial No. 539,914.

*To all whom it may concern:*

Be it known that I, JOSEPH FRIEDLANDER, a citizen of the United States, and a resident of the city of New York, borough of Manhattan, in the county and State of New York, have invented new and Improved Eyeglasses, of which the following is a full, clear, and exact description.

This invention relates to certain improvements in eyeglasses, and more particularly to that form of eyeglasses, in which there are employed finger grips adjacent opposite ends of the bow, and nose clips connected thereto and disposed in the rear of the bow. In the usual form of eyeglasses of this type, levers are pivoted intermediate the ends of the bow and the lens mounts, and are free to swing in a substantially horizontal plane. The front ends of these levers constitute finger grips, and the rear ends carry nose clips. Suitable springs normally tend to press the nose clips toward each other, to grip the bridge of the nose therebetween.

In my improved eyeglasses, the nose clips are separate from the members having the finger grips, and are fastened thereto by a suitable rivet or screw.

The object of my invention is to render eyeglasses of this type neater and simpler in appearance, and to render the metal parts thereof less conspicuous by concealing from view the connections between the nose clips and the finger grip carrying members. To accomplish this, I bring the connection for the nose clip adjacent to and directly in the rear of the connections between the lens mount and the bridge, so that when the eyeglasses are in use, said connections for the nose clips will be invisible.

The invention consists in the construction and combination of parts, one form of which is more fully described hereinafter, and the scope of the invention set forth in the claims.

Reference is to be had to the accompanying drawings, forming a part of this specification, in which similar characters of reference indicate corresponding parts in all the figures, and in which—

Figure 1:
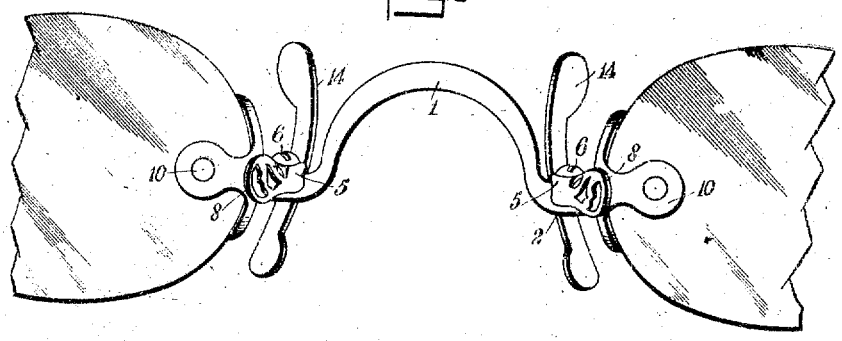
Figure 2:
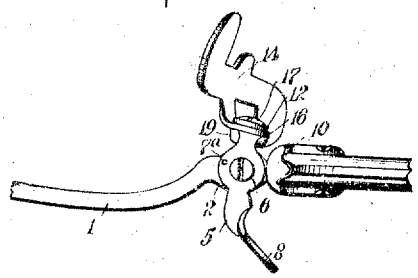
Figure 3:
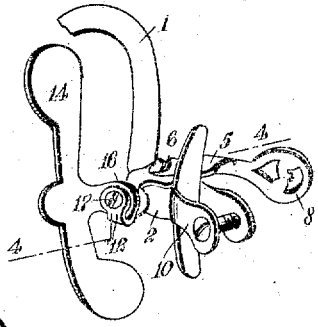
Figure 4:
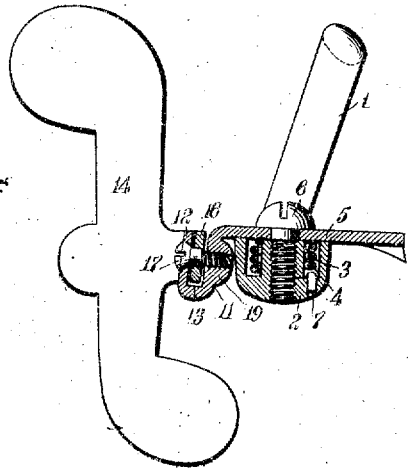

Figure 1 is a front elevation of a pair of eyeglasses constructed according to my invention, the outer portions of the lenses being broken away; Fig. 2 is a plan showing one of the levers and clips, together with a short portion of the bridge and a portion of the adjacent lens; Fig. 3 is a perspective showing one side of the eyeglasses with the lens removed, and further illustrating details of the construction; and Fig. 4 is a detail view upon an enlarged scale and is a vertical section taken on the line 4—4 of Fig. 3 and passing through the extension from the bridge.

I have illustrated my improvement in connection with a pair of eyeglasses having a bow or bridge 1, the opposite ends 2 of which extend outwardly in opposite directions and substantially in alinement. Within these extensions there are annular pockets 3, each of which receives a coil spring 4. A lever 5 extends horizontally across the terminals or outwardly-extending portions 2 of the bow, and each lever is secured in place by a screw 6, which extends through the lever and through a central hub in the extension 2. The spring 4 has one end extending into a recess 7 in the bottom of the pocket and the opposite end extending into an opening $7^a$ in the lever. Each lever covers the annular pocket 3 at its front end, and is bent to lie substantially in a vertical plane and to constitute a finger grip or handle 8, by means of which the eyeglasses may be placed in position or removed. Each bow beyond its outwardly-extending portions 2, terminates in lens mounts or clamps 10. This particular way or connecting the lenses to the bow or bridge and pivotally securing the levers 5 in position, constitutes no portion of my invention, and may therefore be varied at will, without departing from the spirit of my invention. The main feature of my invention resides in the means whereby the levers are connected to nose clips and the connections are concealed from view.

In the specific embodiment of my invention illustrated in the accompanying drawings, each lever 5 is bent downwardly substantially at right angles to form a leaf 11, directly in the rear of the bridge extension 2. Any suitable form of nose clips 14 may be employed, and each nose clip has a lug, ear or extension 16, bent substantially at right angles to the clip and lying adjacent the rear surface of the downwardly-extending leaf 11. The leaf 11 and the lug or ear 16, are secured together and it will be noted that both the leaf and the ear, as well as the securing means, come directly in the rear of the bridge extension 2, so as to be concealed thereby when the eyeglasses are in use. For securing the ear or lug 16 to the leaf 11, various means may be employed, but as illustrated, I form a second leaf 12, integral with the leaf 11 and extending upwardly from the lower end of the latter and substantially parallel thereto, so as to leave a space 13 between the two leaves, substantially equal in width to the thickness of the ear or lug 16. The lug is placed between the two leaves and a screw 17 is extended through both the leaves and the ear, so as to hold the ear in position. If the screw 17 be tightened sufficiently, the clip will be held rigid in respect to the lever, but if it be left slightly loose, the nose clip may swing about the screw as a center. For giving the screw a better holding in the leaf 11, the latter may be constructed of increased thickness, as, for instance, by the use of an enlargement or boss 19 upon the side thereof toward the bridge extension 2, as is illustrated in Fig. 4. In place of a screw, it is, of course, evident that a rivet might be employed as a mechanical equivalent.

I am aware that nose clips have been secured to levers pivoted intermediate the ends of the bridge and the lens mounts, but the main feature of my invention is the means employed whereby the connections between the levers and the clips are effectively concealed adjacent to and in the rear of the connections between the bridge or bow and the lens mounts.

Having thus described my invention, I claim as new and desire to secure by Letters Patent:

1. An eyeglass having bridge extensions at each side thereof, levers pivotally attached to said extensions and passing across said bridge extensions in a substantially horizontal position, the inner extremities of said levers having downward extensions forming inner leaves lying adjacent to the bridge extensions and upward extensions beyond said inner leaves lying remote from said bridge extensions, clips having ears projecting into the spaces between said inner leaves and said outer leaves, and pivot screws passing through said outer leaves and said ears and having a threaded engagement with said inner leaves, said leaves being disposed directly behind said bridge extensions and concealed thereby.

2. Eyeglasses having a bridge with extensions formed near the extremities thereof and adjacent to the point of attachment of the lenses, levers passing across the upper sides of said extensions and pivotally attached to said extensions, springs constraining said levers, said levers being bent to form U-shaped sockets at the inner ends thereof, said U-shaped sockets comprising two substantially parallel leaves, clips having ears projecting into said sockets, respectively, and pivot screws passing through said sockets and having their heads seating in one of said leaves and having threaded ends engaging in the other of said leaves.

3. An eyeglass having bridge extensions at each end thereof, levers pivotally attached to said extensions, the inner extremities of said levers having laterally bent extensions, clips having ears, and pivot screws attaching said ears to said lever extensions and having threads engaging the same, said lever extensions having bosses formed thereupon projecting toward said bridge extensions and receiving the body of said pivot screws.

4. An eyeglass mounting having a bridge with extensions at each end thereof, vertically-extending pivots attached to said extensions, levers secured to said pivots and each movable in a horizontal plane, the inner extremity of each lever being bent downwardly substantially at right angles to lie adjacent the rear surface of its corresponding bridge extension and be concealed thereby, and clips having ears secured to said downward extremities.

5. An eyeglass mounting having a bridge with extensions at each end thereof, levers pivotally attached to said extensions to swing in horizontal planes, the inner extremities of said levers being bent substantially at right angles to lie closely adjacent the rear surface of said bridge extensions and to be concealed thereby, and clips having ears secured to said extremities.

6. An eyeglass mounting having a bridge with extensions at each end thereof, vertically-extending pivots carried by said extensions, levers carried by said pivots, springs encircling said pivots and tending to move said levers, each lever having the end thereof bent substantially at right angles to lie behind the pivot and the spring and to be normally concealed from view from the front of the eyeglass, and clips having ears secured to the said ends of said levers.

7. An eyeglass mounting having a bridge with extensions at each end thereof, levers pivotally attached to said extensions, the inner extremities of said levers being bent to lie behind said extensions, and clips having ears secured to said extremities, the connections between said extensions and said clips being normally disposed behind and concealed by said extensions.

8. An eyeglass mounting having a bridge with extensions at each end thereof, levers pivotally attached to said extensions, the inner extremities of said levers having extensions bent to lie behind said bridge extensions and be concealed thereby, said lever extensions being bent back upon themselves to form two substantially parallel portions, and clips having ears secured in position between said portions.

9. An eyeglass having a bridge with lateral extensions, levers pivoted to said extensions and each movable in a substantially horizontal plane, the inner extremity of each lever being bent to lie adjacent the rear surface of its corresponding bridge extension and concealed thereby, and clips having means secured to said lever extensions.

10. An eyeglass having a bridge, lens-holding members, connections between the ends of said bridge and said lens-holding members, levers secured at said connections and each movable in a substantially horizontal plane, the inner extremity of each lever being bent to lie adjacent the rear surface of its corresponding bridge extension and to be concealed thereby, and clips having means secured to said lever extensions.

11. An eyeglass having a bridge, lens-holding members, connections between the ends of said bridge and said lens-holding members, arms secured intermediate their ends to said connections, the front ends of said arms constituting finger grips and the rear ends of said arms being bent to lie adjacent the rear surface of its corresponding bridge end and lens-holding connection and concealed thereby, and clips having ears secured to said bent ends of said levers.

In testimony whereof I have signed my name to this specification in the presence of two subscribing witnesses.

JOSEPH FRIEDLANDER.

Witnesses:
CLAIR W. FAIRBANK,
PHILIP D. ROLLHAUS.